March 8, 1966 F. C. CURTIS ET AL 3,238,603

METHOD OF MANUFACTURING A MAGNETIC TRANSDUCER

Filed Oct. 26, 1961 3 Sheets-Sheet 1

INVENTORS.
FRED C. CURTIS
DONALD D. LARSON
BY RICHARD E. THOMAS
CECIL W. LIBBY

Christie, Parker & Hale
ATTORNEYS

METHOD OF MANUFACTURING A MAGNETIC TRANSDUCER

Filed Oct. 26, 1961 3 Sheets-Sheet 2

INVENTORS.
FRED C. CURTIS
DONALD D. LARSON
RICHARD E. THOMAS
CECIL W. LIBBY
BY
Christie, Parker & Hale
ATTORNEYS.

METHOD OF MANUFACTURING A MAGNETIC TRANSDUCER

Filed Oct. 26, 1961 3 Sheets-Sheet 3

INVENTOR.
FRED C. CURTIS
DONALD D. LARSON
RICHARD E. THOMAS
CECIL W. LIBBY

BY Christie, Parker & Hale
ATTORNEYS

United States Patent Office
3,238,603
Patented Mar. 8, 1966

3,238,603
METHOD OF MANUFACTURING A MAGNETIC TRANSDUCER

Fred C. Curtis, South Pasadena, Donald D. Larson, Glendora, Richard E. Thomas, Monrovia, and Cecil W. Libby, Burbank, Calif., assignors to Burroughs Corporation, Detroit, Mich., a corporation of Michigan Filed Oct. 26, 1961, Ser. No. 147,977
6 Claims. (Cl. 29—155.5)

This invention relates to methods of manufacturing magnetic transducers and, more particularly, to procedures for manufacturing a magnetic transducer for simultaneously reading and writing on a magnetic carrier.

This invention is directed to the method of manufacturing a dual gap magnetic transducer of the type described in an earlier filed application of Fred C. Curtis et al. bearing Serial No. 140,133, filed on September 22, 1961, and assigned to the same assignee as the present invention.

In present day digital data processing systems and operations it is highly desirable to check the recording of a desired signal with a minimum time delay to eliminate any possible sources of error. The magnetic carriers employed in these digital systems have taken the form of the multiple track magnetic tapes utilizing high density recording techniques. The advantage of simultaneously reading and writing from a magnetic carrier, or providing a "write-check" feature, is that the number of elements of a computing system can be minimized if the time delay interval between writing and reading can be substantially reduced, as well as accelerating the rate at which the digital information is delivered to a magnetic carrier. This reduction in time delay has been achieved largely through the incorporation of the reading and writing functions into a single magnetic transducer or package. The time delay is dependent on the spacing between the writing transducer and the reading or "checking" transducer. This spacing and, therefore, the time delay, particularly when a single read-write transducer is employed, is governed by the amount of cross-coupling or cross-talk between the writing structure and the reading structure. Various techniques, both packaging and electrical techniques, have been devised for reducing this cross coupling or cross-talk between transducing structures.

In addition to the cross-coupling problems for producing a read-write or dual gap transducer, physical considerations of the magnetic structures and methods and costs of manufacture of the transducer and the components thereof must be considered to produce a practical, commercially acceptable magnetic transducer exhibiting simultaneous read and write capabilities. A commercially acceptable magnetic transducer must have an inter-gap spacing to provide this read-write or "write-check" operation on the order of two milliseconds, particularly when employed in data processing systems.

This invention provides an improved method of manufacturing a magnetic transducer that is capable of reading and writing simultaneously in a plurality of channels on a magnetic carrier when the gap-to-gap spacing for a single channel is on the order of 0.150 inch. The improved method steps provide a transducer of modular construction and particularly advantageous is the modular construction of the electromagnetic assemblies for effecting the reading and writing operations. A substantial reduction in manufacturing costs is realized from this modular construction of the electromagnetic assemblies.

From a procedural standpoint the invention includes the steps of assembling a plurality of separate electromagnetic sub-assemblies for providing either a reading or writing operation. The electromagnetic sub-assemblies are preferably constructed in terms of insulated, stacked, U-shaped, magnetic laminations. The U-shaped laminations are provided with a reading or writing winding mounted thereon and the individual sub-assemblies are positioned in a carrier or block with the separate reading and writing sub-assemblies arranged in a spaced apart relationship in a reading or writing block and the winding terminals are connected by means of a higher current capacity lead wire to an electrical connector. The face of the reading and writing blocks exposing the electromagnetic sub-assemblies are encapsulated. The pole faces may be shaped to concentrate the flux through the electromagnetic structure by cutting a longitudinal groove adjacent to the magnetic carrier exposed end of the reading and writing blocks and then shaping these surfaces. In the same fashion, a shielding module block is assembled and which block comprises a plurality of alternately arranged electromagnetic and electrostatic shielding elements and a stack of magnetic laminations for substantially closing the end of the U-shaped sub-assemblies when they are arranged side-by-side. The opposite faces of the shielding block are also cut with a longitudinal groove to shape the pole pieces and further shaped to mate with the adjacent faces of the shaped reading and writing blocks. These reading and writing blocks are assembled on the opposite sides of the dividing block and sandwich a transducing gap element therebetween. The assembled blocks are connected together and shaped to have a radius. Prior to final shaping, a longitudinal groove is cut into the magnetic carrier exposed end of the dividing block and a non-magnetic, conductive element secured therein. This final arrangement is then finally lapped prior to final testing.

These and other features of the present invention may be more fully appreciated when considered in the light of the following specification and drawings, in which.

Figure 1:
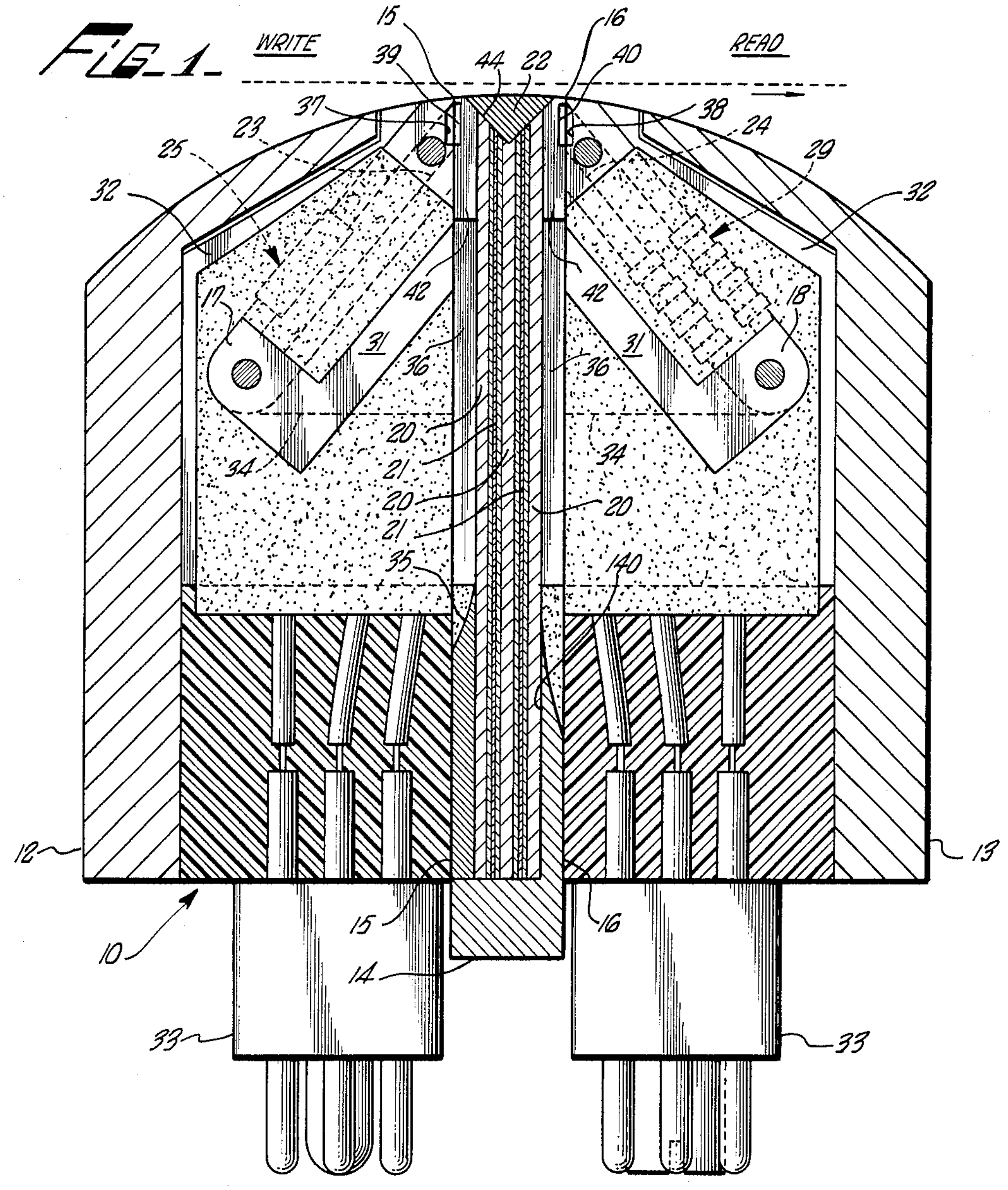
FIGURE 1 is a longitudinal, cross-sectional view of the dual gap read-write transducer with parts shown in elevation and embodying the invention.

Now referring to the drawings, the structural organization of the dual gap read-write transducer 10 as embodied for providing a transducing operation on a magnetic carrier in the form of a magnetic tape of one-half of an inch in width and having seven recording channels for the storage of binary coded digital information will be described. This practical embodiment of the invention will be examined merely to facilitate the description of the invention. Magnetic tapes for use in commercial digital applications presently employ tracks having a width on the order of 0.048 inch for writing and 0.032 inch for reading. Accordingly, the dual gap transducer 10 will be examined in view of this commercial arrangement of a magnetic carrier, although it should be recognized that the concept of this invention is applicable to other magnetic arrangements.

The dual gap read-write transducer 10 generally comprises a write block or module 12 and a read block or module 13 arranged on opposite sides of a dividing block or module 14 and sandwiching a pair of high reluctance members 15 and 16 respectively arranged therebetween. The write block or module 12 comprises a plurality of electromagnetic transducing structures or modules 17, in this instance seven modules, particularly adapted for writing on a magnetic carrier, while a similar plurality of electromagnetic structures or modules are arranged and mounted on the read block 13 and are particularly adapted for reading from a magnetic carrier. The divider block or module 14 mounts a plurality of alternately and selectively arranged electrostatic and electromagnetic shielding members, respectively identified by the reference characters 20 and 21, and including a non-magnetic, conductive element 22 arranged on the magnetic carrier exposed end of the transducer 10.

A more comprehensive description of the transducer 10 will be found in the above-identified Curtis et al. application.

With the above general organization of the modules for the dual gap read-write transducer 10 in mind, the detailed structural organization of the sub-modules can be best understood from an examination of the step-by-step construction of the elements that are incorporated into the write, read, and divider blocks or modules 12, 13, and 14.

The write and read blocks or carriers 12 and 13 comprise substantially rectangular elements of a non-magnetic material, such as aluminum, each provided with a substantially central cavity $12^a$ and $13^a$, respectively, defined to accommodate their respective plurality of write modules 17 and read modules 18. To this end, the read and write blocks 12 and 13 are defined with a plurality of spaced channels, similar to the channels $12^b$ and $13^b$, extending from the inside edge of the cavities $12^a$ and $13^a$, respectively, to the magnetic tape exposed side of the blocks. In addition, the blocks may be provided with securing apertures similar to the apertures $12^c$ and $13^c$ to accommodate fasteners for holding the modules of the transducer 10 together.

Figures 2, 2A:
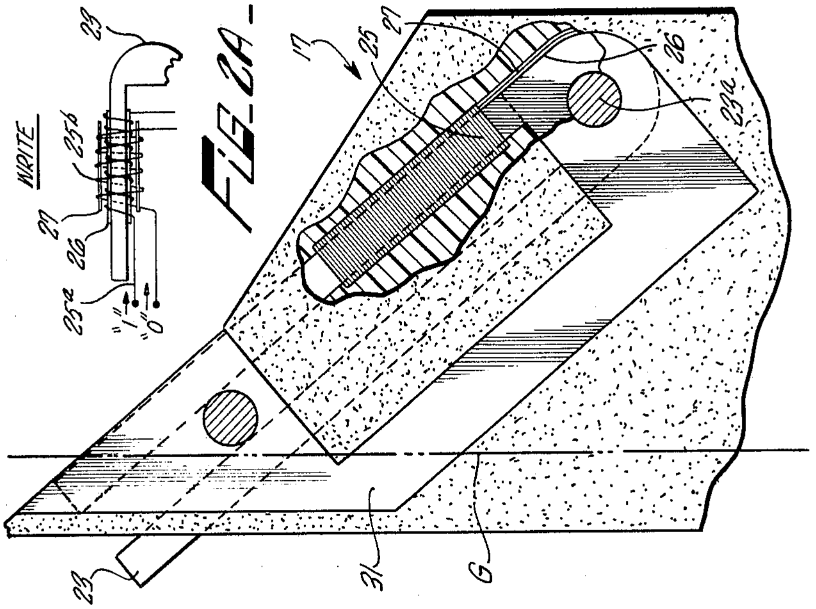
FIGURE 2 is an elevational view, with portions shown in section, of the electromagnetic module for the write portion of the transducer of FIGS. 1 and 2 shown prior to final processing.
FIGURE 2A is a schematic representation of the arrangement of the write windings illustrated in FIGS. 1 and 2.
Figures 3, 3A:
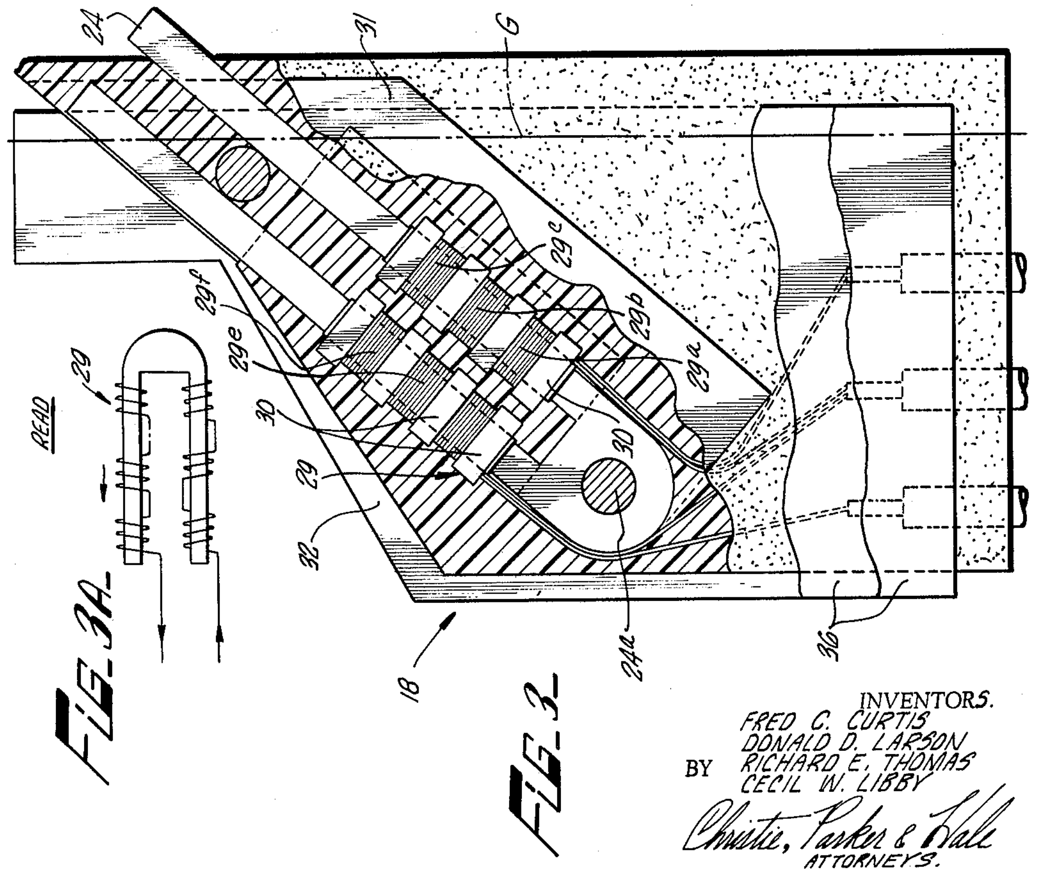
FIGURE 3 is a cross-sectional view, with portions shown in section, of the electromagnetic module for the read portion of the transducer of FIGS. 1 and 2 shown before final processing.
FIGURE 3A is a schematic representation of the arrangement of the read windings illustrated in FIG. 3.

The write and read electromagnetic structures 17 and 18 are preferably constructed in a modular form and which modular form simplifies the construction, assembly, and testing of the dual gap transducer 10 leading to an inexpensive assembly procedure. The modular arrangement merely requires that each module be constructed and tested in the same fashion and then assembled into the respective write and read divider blocks 12 and 13. The modular assemblies for the write and read structures 17 and 18 are shown in FIGS. 2 and 3, respectively, prior to final turning, grinding, and lapping, and will be seen to include substantially U-shaped magnetic elements 23 and 24. As a result of the final processing of the transducer 10, the portions of the structures 17 and 18 shown to the left and right, respectively, of the dot-dash lines G are removed or ground away. Each of the magnetic elements 23 and 24 comprise a low reluctance, magnetic material and are preferably defined and constructed in terms of thin, ferromagnetic laminations, commercially identified as Hy Mu 80, for example, on the order of 0.0040 inch thick, similar to the laminations identified as 23W and 23R; see FIG. 4. The laminations are individually insulated, stacked, and bonded together to define the U-shaped magnetic elements 23 and 24. The elements 23 and 24 will have a thickness of about 0.048 inch when employed for the use with the above-described magnetic tape or have a thickness in accordance with the width of the tracks in the magnetic carrier for which the transducer 10 is to be used. The closed end of the U-shaped laminations 23W and 23R may include an aligning aperture similar to the apertures $23^a$ and $24^a$ to allow an alignment pin to be inserted through the stack for allowing the laminations to be aligned prior to bonding them together. These assemblies, then, define the substantial portions of the magnetic arrangements of the electromagnetic structures 17 and 18.

The electrical portions of the electromagnetic structures 17 and 18 comprise the winding means magnetically coupled thereto. Considering first the construction of the winding means 25 for the write structure 17, it will be noted from both FIGS. 2 and 2A that a single winding means 25 is shown magnetically coupled to the magnetic structure 23. In the practical embodiment, the winding means 25 comprises a pair of coils wound on a single arm of the U-shaped structure 23 and which coils are shown in the schematic view of FIG. 2A, in particular, as comprising the coils $25^a$ and $25^b$ wound in opposite directions on the magnetic structure 23, with the coil $25^b$ wound over the coil $25^a$ and coextensive therewith. In the procedure for winding the coils $25^a$ and $25^b$ the coils are wound on a tubular mounting member 26 adapted to be slidably telescoped over an arm of the U-shaped magnetic structure 25. The coils $25^a$ and $25^b$ may be wound in a single operation with the coil $25^a$, for example, wound over the mounting member 26 in one direction and then the terminal end of the coil is withdrawn a predetermined amount and the coil $25^b$ is then wound over an insulating sleeve 27 in the opposite direction. The common loop may then be cut to define a pair of writing coils and, electrically, these ends may be connected in common. The ends of the coils are connected to an electrical connector, as will be described.

The reading winding means 29 comprises a pair of coils arranged on both arms of the magnetic structure 24 and are wound as a plurality of multi-layer coils spaced apart by spacing elements, similar to the "Pie" spacers identified by the reference character 30. Each of the coils $29^a$, $29^b$, and $29^c$ are electrically connected in series aiding relationship for placement on an arm of the magnetic structure 24 and with one end of the thus defined coil portion brought back to extend parallel to the arm for connection to an electrical connector. In the same fashion, the coil portions $29^d$, $29^e$, and $29^f$ on the other arm are wound and connected with one end brought back for connection to an electrical connector.

An important aspect of the described construction of the write winding means 25 and the read winding means 29 is the provision for reducing the inter-coil capacitance. In the case of the write winding means 25 the inter-coil capacitance is reduced through the provision of the insulating sleeve 27, while the same function is performed by the "Pie" spacers 30 for the read wiring 29. The different insulative arrangements are necessitated by the difference in functions of these coils and the different currents carried by same. Another important aspect of the construction of the electromagnetic structure for the read transducers 18 is that the U-shaped construction allows a pair of coils to be mounted on the opposed arms of the magnetic structure 24 and, therefore, although the coils are electrically connected in a series aiding relationship with regard to the flux detected from the magnetic tape, their arrangement with respect to stray magnetic flux, that may be coupled thereto from the adjacent write transducer or read transducer, is such that the flux cuts the opposed coils to generate voltages that are in opposite directions or have opposed polarities and, therefore, tend to cancel one another and is an important factor in reducing the cross-coupling or cross-talk of the transducer 10.

It should be recognized that the coils are wound with a fine wire, as in conventional magnetic transducers, and require that a heavier wire, one of larger current carrying capacity, be connected thereto. In accordance with the procedure of manufacturing the present invention, these heavier wires can be connected by soldering them to the end terminals of the coils prior to assembly in the transducer body. Assembly in this fashion leads to a reduction in manufacturing costs since, if a lead wire of a coil is broken as a result of the soldering operation, the module by module testing will show this and only a defective module need be discarded rather than the entire transducer, as in the prior art methods. With the assembly of these writing and reading winding means 25 and 29 on the magnetic structures 23 and 24 and the soldering of the heavy lead wires, the assembly of these electromagnetic structures is complete.

Figure 4:
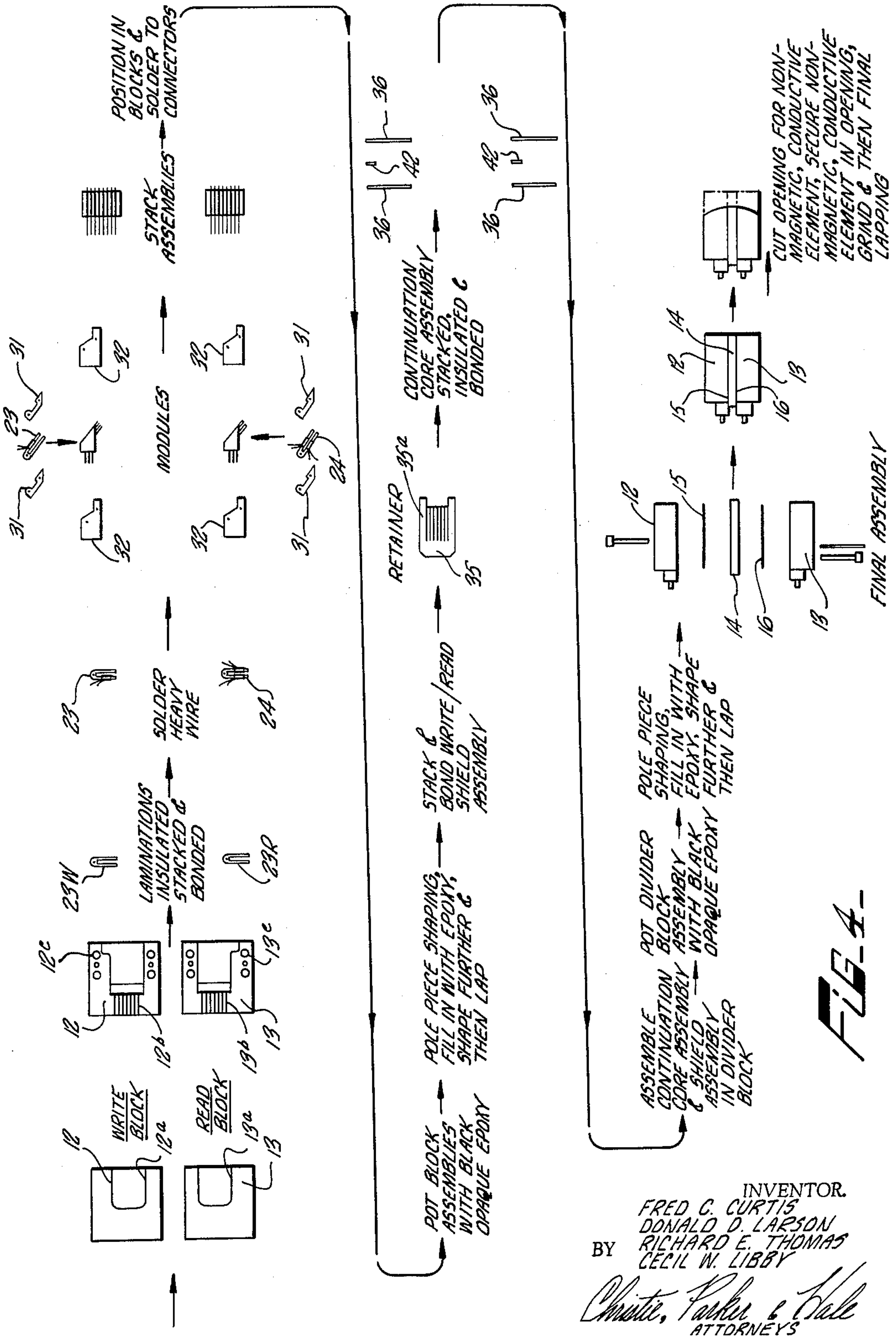
FIGURE 4 is an exploded view of a typical assembly procedure for manufacturing the transducer of FIG. 1.

The above described electromagnetic assemblies are arranged to be individually magnetically shielded. To this end, a non-magnetic spacer is arranged and defined in a substantially U-shaped configuration, similar to the spacer identified by the reference character 31, shown in FIG. 4, and is mounted to bridge the coils wound on the corresponding electromagnetic structures 23 and 24. The spacers 31 may be provided with a pair of aligning apertures having the same diameter and arranged concentric with the alignment apertures $23^a$ and $24^a$ and with a similar alignment aperture adjacent the open end of magnetic structures 23 and 24 for accepting an alignment pin to align this open end of the magnetic stack, see FIG. 1, for example. The spacers 31 are arranged on opposite sides of the magnetic assemblies 23 and 24 and are enclosed by means of inter-track magnetic shielding elements, similar to the shielding element identified by the reference character 32. Since it is desired to mount the electromagnetic structures for the write and read transducers 17 and 18 at an angular relationship to minimize the cross-coupling between associated write and read transducers, the magnetic shielding elements 32 are defined to completely enclose the magnetic structures 23 and 24 except for allowing a small portion of the open end of these U-shaped structures to be exposed. The shielding elements 32, therefore, have a multiplicity of sides, as shown in FIGS. 2 and 3. The lead wires for the writing winding means 25 and the reading winding means 29 also extend outwardly from this modular arrangement. As shown in FIG. 4, the magnetic shielding elements 32 are arranged on opposite sides of the magnetic structures 23 and 24. This arrangement may then be encapsulated such as by potting to secure the modules together to allow them to be readily handled as a sub-assembly for insertion into their respective write and read blocks 12 and 13. It will be recognized that the electrical properties of the read and write coils will be examined during the manufacturing process to determine whether the coils are operative and have the correct electrical characteristics prior to final assembly into the read and write blocks. Once again, if any one module is incomplete or below standards, it need only be discarded rather than the entire transducer.

The thus assembled and checked modules 17 and 18 are then aligned and stacked by means of the positioning rods passed through the aligning apertures $23^a$ and $24^a$ in a special fixture therefor. The thus stacked assemblies of modules 17 and 18 are positioned in their respective write and read blocks 12 and 13 with the open end of the U-shaped structure arranged in alignment with the outer ends of the channels $12^b$ and $13^b$ in these blocks. The exposed heavy lead wires extend into their cavities $12^a$ and $13^a$ and are connected to the electrical connector. The electrical connector comprises a commercially available multi-pin connector of the type sold by the Continental Electronics Company and is similar to the connector identified by the reference character 33. The electrical connector abuts the writing and reading blocks 12 and 13 opposite the magnetic carrier exposed end thereof to receive the lead wires that are arranged in the cavities $12^a$ and $13^a$ and are electrically connected thereto by soldering or the like.

The electromagnetic structures are spaced in the write and read block by means of end spacers similar to the one identified by the reference character 34. These write and read blocks 12 and 13 may then be encapsulated or potted with a black opaque epoxy compound to fix the organization of the modules 17 and 18. The potted write and read assemblies have their interfaces ground to the required dimensions. After grinding, the magnetic carrier exposed pole faces are shaped to cause a concentration of the flux at the transducing gaps to minimize the leakage flux around the transducing gaps; the resulting magnetic structure upon assembly of the transducer 10 is best seen in FIG. 1. An examination of FIG. 1 will reveal that both the write and read blocks 12 and 13 as well as the divider block 14 have their magnetic structures similarly cut away to concentrate the flux at the transducing gaps. A transverse groove, respectively identified by the reference characters 37 and 38 on the write and read blocks 12 and 13, cooperates with similar grooves 39 and 40 arranged on the magnetic core pieces carried by the divider block 14.

It should be recognized that the cutting away of the magnetic material on the three blocks 12, 13, and 14 in this fashion reduces the cross-sectional area of the portion of the magnetic structure adjacent the transducing gap whereby a high reluctance path is defined with respect to the flux paths bridging the transducing gaps and thereby causes a concentration of flux passing through the gaps and minimizes the leakage flux whereby an improved and more efficient transducing action results.

The divider block 14 comprises a substantially rectangular, non-magnetic element, preferably of aluminum, having a cavity $14^d$ (see FIG. 1) arranged on one side thereof to accommodate the shielding means mounted thereon. The shielding means is first assembled by building up a stack of electrostatic and electromagnetic laminations of preselected thickness. The electrostatic shields 20 may comprise a thin, rectangular, conductive element, which may be copper, while the electromagnetic shields 21 comprise a thin, rectangular, magnetic element, such as a Hy Mu 80 metal. The shielding means is preferably arranged whereby the electromagnetic and electrostatic shields 20 and 21 are alternately arranged on opposite sides of a central electrostatic shield 20. Although any number of shields may be utilized, three electrostatic shields 20 are utilized and the outer electrostatic shields are arranged outwardly of the stack to sandwich an electromagnetic shield 21 therebetween. As will be seen from examining the drawings, it will be recognized that the outer shielding elements 20 engage the magnetic core assemblies carried by the divider block 14. When the outer shielding elements are defined as electromagnetic shields, it has been found that the shields define secondary transducing gaps and modify the flux path of the transducing structure. The formation of these secondary transducing gaps is prevented in accordance with this invention through the placement of the electrostatic shielding elements 20 adjacent the magnetic structure, as illustrated.

When assembled in this fashion, then, the stack is bonded together and then assembled into the divider block cavity $14^d$ and maintained therein by positioning a retaining element 35 over the exposed shielding element 20. The retaining element 35 includes a plurality of longitudinally extending grooves $35^a$ similar to the grooves $12^b$ and $13^b$, for retaining the inter-track shielding elements similar to the one identified by the reference character 36. The retaining element 35, when positioned in the divider block 14, allows the outermost end of the cavity $14^d$ to be exposed. This outer end of the divider block 14 secures the continuation core assemblies 42 for the write and read electromagnetic structures 17 and 18.

The continuation core assemblies 42 comprise a stack of insulated, bonded, thin, rectangular, magnetic laminations of the same material as the U-shaped laminations 23W and 23R defining the magnetic structure proper. These continuation core assemblies 42 are arranged on the divider block 14 on the opposite sides of the shielding elements 20 at the magnetic carrier exposed end thereof between a pair of non-magnetic spacers 43 and which spacers may be a beryllium copper material. After the divider block 14 is assembled in this fashion, it may be encapsulated or potted with a black opaque epoxy to secure the sub-assembly together and then has its interface ground to the desired dimension. After the grinding operation, the continuation core assemblies 42 are cut to provide the pole shaping grooves 39 and 40 described hereinabove. The exposed surfaces of the divider block 14 may then be lapped to provide both sides with the required dimensions to match with the lapped surfaces of the write and read blocks 12 and 13 when fastened together.

The divider block 14 may also be provided with transverse apertures arranged in alignment with the securing apertures for the write block and read block 12 and 13 to allow the three elements to be fastened together.

With these three modular assemblies completed, the dual gap read-write transducer 10 may then be fastened together with the gap materials 15 and 16 to complete the assembly of the transducer 10. The gap materials 15 and 16 are arranged on opposite sides of the divider block 14 and are arranged coextensive therewith so that when the write block and the read block 12 and 13 are fastened together the gap materials 15 and 16 are arranged between the magnetic structures 23 and 24 and the continuation core assemblies 42 whereby they form the high reluctance gap or transducing gaps in an essentially closed magnetic structure defined by the closing of the U-shaped structures 23 and 24 by the continuation core assemblies 42. When the three blocks are assembled and secured together in this fashion, the final turning, grinding, and lapping operations may be performed on the magnetic carrier exposed surface of the transducer 10 such as to give it a final radius or contour conventional with magnetic transducers.

It should be noted, however, that prior to the final lapping, the thus assembled and turned transduer 10 is cut or ground at the magnetic carrier exposed end of the divider block 14 with a longitudinally extending aperture 44, shown as a V slot to accept the non-magnetic, conductive element 22. The non-magnetic element 22 prevents any inter-action between the magnetic carrier and the shielding means, in particular the electromagnetic shielding elements 21. It has been found that a de-magnetizing effect is produced upon the magnetic carrier itself when the electromagnetic shielding elements are exposed to the carrier. This results due to the bridging of a recorded binary bit between electromagnetic shielding elements of the shielding means and, by spacing the electromagnetic shielding elements from the magnetic carrier, improved operation results. Furthermore, to minimize the contour effect due to the definition of a sharp angle with the continuation core assemblies 42, the groove 44 and, therefore, the element 22 is defined to extend into the core assemblies 42.

After the element 22 is secured in the groove 44, the transducer 10 is finally lapped to the desired dimension to complete the assemblies thereof.

What is claimed is:

1. A method of manufacturing a magnetic transducer including the steps of assembling a plurality of electromagnetic transducing modules for reading or writing on a magnetic carrier, positioning and securing all the reading transducing modules in a body member, positioning and securing all the writing transducing modules in a body member, assembling a shielding module comprising a plurality of alternately arranged electromagnetic and electrostatic shielding elements including arranging continuation core assemblies as the outer members of the module, providing a pair of high reluctance elements of a length substantially coextensive with said body members, arranging the reading and writing body members on opposite sides of the shielding assembly with one of the high reluctance elements arranged on opposite sides of the shielding assembly and between said body members, securing the arrangement together, shaping the magnetic carrier exposed end of the secured sub-assemblies including providing an arcuate contour to said end and then grinding and lapping same, cutting a longitudinal groove at the magnetic carrier exposed end of the shielding assembly for the shaped and secured transducer modules, and securing a non-magnetic element in the longitudinal groove of the shaped and secured transducer modules prior to final grinding and lapping.

2. A method of manufacturing a magnetic transducer comprising providing a plurality of electromagnetic sub-assemblies for effecting either a reading or writing operation including the steps of stacking a plurality of U-shaped, insulated, magnetic laminations to a preselected thickness, positioning a transducing winding on at least one arm of the stack of laminations in an insulative relationship therewith, arranging magnetic shielding elements on opposite sides of the thus assembled electromagnetic structures, encapsulating the resulting electromagnetic sub-assembly, positioning all the electromagnetic sub-assemblies for producing a reading operation in a reading module block, encapsulating the sub-assemblies in the reading block, shaping the surface of the electromagnetic sub-assembly exposed to a magnetic carrier, processing the writing electromagnetic sub-assemblies into a writing module block in substantially the same fashion as defined by the above steps for the reading module block, assembling a shielding module block comprising a plurality of alternately arranged electromagnetic and electrostatic shielding elements, said shielding module block including continuation core assemblies arranged on opposite sides thereof and comprising stacked magnetic laminations defined to substantially close the flux path of the U-shaped laminations when the shielding module block and the reading or writing module blocks are positioned side-by-side, shaping the opposite sides of the shielding module blocks to respectively mate with the reading and writing blocks, providing a pair of high reluctance elements of a length substantially coextensive with said carriers, arranging the reading and friting module blocks on opposite sides of the shielding module with one of the high reluctance elements arranged on opposite sides of the shielding module block and between said reading and writing blocks, securing the arrangement of module blocks together, and finally shaping the magnetic carrier exposed end of the secured sub-assemblies.

3. A method of manufacturing a magnetic transducer comprising assembling a plurality of separate U-shaped laminations as sub-assemblies for providing either a reading or writing operation, positioning all the sub-assemblies for producing a reading operation in a reading module block, encapsulating the sub-assemblies in the reading block, shaping the surface of the sub-assembly exposed to a magnetic carrier, processing the writing sub-assemblies into a writing module block in substantially the same fashion as defined by the above steps for the reading module block, assembling a shielding module block comprising a plurality of alternately arranged electromagnetic and electrostatic shielding elements, said shielding module block including continuation core assemblies arranged on opposite sides thereof and comprising stacked magnetic laminations defined to substantially close the flux path of the U-shaped laminations when the shielding module block and the reading or writing module blocks are positioned side-by-side, shaping the opposite sides of the shielding module blocks to respectively mate with the reading and writing blocks, providing a pair of transducing gap elements, arranging the reading and writing module blocks on opposite sides of the shielding module with one of the gap elements arranged on opposite sides of the shielding module and between said blocks, securing the arrangement of module blocks together, and finally shaping the magnetic carrier exposed end of the secured sub-assemblies.

4. A method of manufacturing a magnetic transducer comprising providing a plurality of electromagnetic sub-assemblies for effecting either a reading or writing operation including the steps of stacking a plurality of U-shaped, insulated, magnetic laminations to a preselected thickness, positioning a transducing winding on at least one arm of the stack of laminations in an insulative relaship therewith, arranging magnetic shielding elements on opposite sides of the thus assembled electromagnetic structures, encapsulating the resulting electromagnetic sub-assembly, positioning all the electromagnetic sub-assemblies for producing a reading operation in a reading module block, encapsulating the sub-assemblies in the reading block, shaping the surfaces of the electromagnetic sub-assembly exposed to a magnetic carrier, processing the writing electromagnetic sub-assemblies into a writing module block in substantially the same fashion as defined by the above steps for the reading module block, assembling a shielding module block comprising a plurality of alternately arranged electromagnetic and electrostatic shielding elements, said shielding module block including continuation core assemblies arranged on opposite sides thereof and comprising stacked magnetic laminations defined to substantially close the flux path of the U-shaped laminations when the shielding module block and the reading or writing module blocks are positioned side-by-side, shaping the opposite sides of the shielding module blocks to respectively mate with the reading and writing blocks, providing a pair of transducing gap elements, arranging the reading and writing module blocks on opposite sides of the shielding module with one of the gap elements arranged on opposite sides of the shielding module and between said blocks, securing the arrangement of module blocks together, and finally shaping the magnetic carrier exposed end of the secured sub-assemblies.

5. A method of manufacturing a magnetic transducer for simultaneously reading and writing on a magnetic carrier and in which the reading and writing gaps are separated on the order of 0.150 inch comprising providing a plurality of electromagnetic sub-assemblies for effecting either a reading or writing operation including the steps of stacking a plurality of U-shaped, insulated, magnetic laminations to a preselected thickness, positioning a transducing winding on at least one arm of the stack of laminations in an insulative relationship therewith, arranging magnetic shielding elements on opposite sides of the thus assembled electromagnetic structures, encapsulating the resulting electromagnetic sub-assembly, positioning all the electromagnetic sub-assemblies for producing a reading operation in a reading module block, encapsulating the sub-assemblies in the reading block, shaping the electromagnetic sub-assembly exposed surface of the reading module block, processing the writing electromagnetic sub-assemblies into a writing module block in substantially the same fashion as defined by the above steps for the reading module block, cutting a groove in each of said reading and writing module blocks adjacent the magnetic carrier exposed ends for shaping the pole pieces thereof, assembling a shielding module block comprising a plurality of alternately arranged electromagnetic and electrostatic shielding elements, said shielding module including continuation core assemblies arranged on opposite sides thereof and comprising stacked magnetic laminations defined to substantially close the flux path of the U-shaped laminations when the shielding module block and the reading or writing module blocks are positioned side-by-side, shaping the opposite sides of the shielding module blocks to respectively mate with the reading and writing blocks, said shaping step including the step of shaping said continuation core assemblies consistent with the shaping of the electromagnetic assemblies for concentrating the flux therein, providing a pair of high reluctance elements of a length substantially coextensive with said blocks, arranging the reading and writing module blocks on opposite sides of the shielding module block with one of the high reluctance elements arranged on opposite sides of the shielding module block and between said reading and writing blocks, securing the arrangement of module blocks together, and finally shaping the magnetic carrier exposed end of the secured blocks.

6. A method of manufacturing a magnetic transducer as defined in claim 5 including the additional step of cutting a longitudinal groove at the magnetic carrier exposed end of the roughly shaped secured blocks in the shielding block, securing a non-magnetic element in the longitudinal groove, and then finally lapping said magnetic carrier exposed end.

References Cited by the Examiner

UNITED STATES PATENTS

| | | | |
|---|---|---|---|
| 2,914,621 | 11/1959 | Donceel et al. | 179—100.2 |
| 3,005,879 | 10/1961 | Moehring | 179—100.2 |
| 3,041,413 | 6/1962 | Williams | 179—100.2 |
| 3,043,919 | 7/1962 | Tannenbaum et al. | 179—100.2 |
| 3,064,333 | 11/1962 | Kristiansen et al. | 179—100.2 |

JOHN F. CAMPBELL, *Primary Examiner.*

WHITMORE A. WILTZ, *Examiner.*